April 10, 1945.　　　A. B. ARNOLD　　　2,373,218
OIL COOLER TUBE
Filed Nov. 11, 1942
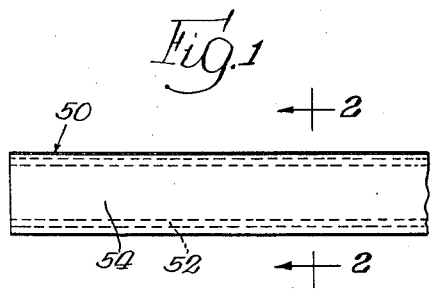
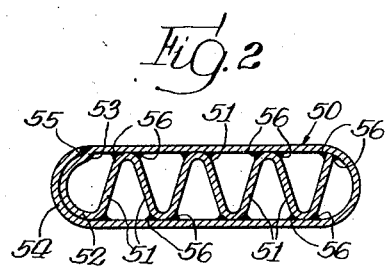
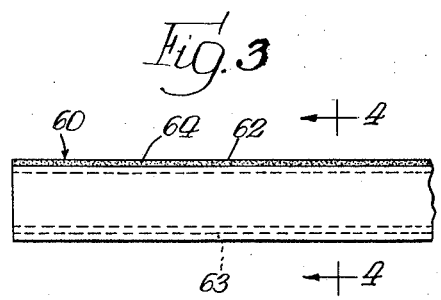
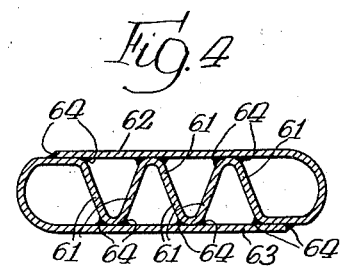
INVENTOR.
Arthur B. Arnold,
BY
Attys.

Patented Apr. 10, 1945

2,373,218

UNITED STATES PATENT OFFICE 2,373,218

OIL COOLER TUBE

Arthur B. Arnold, Racine, Wis., assignor to Modine Manufacturing Company, Racine, Wis., a corporation of Wisconsin Application November 11, 1942, Serial No. 465,198

4 Claims. (Cl. 138—38)

The present invention relates to a fluid conduit for heat transfer cores and comprises in general a tube provided with a certain internal fin construction for the sole purpose of carrying out the principles of this invention. This tube may be utilized in any type of heat exchange unit and, obviously, may be used with cores having an enclosed water jacket surrounding said tubes or the tubes may be provided with fins joining the exteriors thereof and exposed for heat dissipation in the usual manner as is known in the art.

The fluid conduit of the present invention is primarily directed and more specifically adapted for use in an oil cooler, but need not be limited thereto. One of the problems encountered in the cooling of the lubricating oils is to provide an oil cooler with tubes that will function efficiently in carrying out the purpose for which the unit is intended inasmuch as several of the conditions which prevail are difficult to overcome. One of the conditions is the difficulty encountered in producing oil flowage in the tubes of an oil cooling core by reason of the relatively high viscosity or general sluggishness of lubricating oils and the more particular problem being the manner in which this viscosity is so rapidly increased with a decrease in the temperature of the oil. For example, with ordinary automobile lubricating oil of the SAE No. 30 grade, it is found that oil of this viscosity will take approximately sixty seconds 210° F. to pass through a certain sized orifice, while the same oil will require four-hundred seconds to flow through the same orifice when the temperature of this oil is reduced to 110° F.

It is a known fact that liquids passing through conduits such as tubes will have a higher velocity at the central portions of the tubes with respect to the liquid which flows adjacent the walls of the tubes by reason of the normal frictional reaction of said walls. This is true for any form of liquid which may be compelled to pass through tubes, pipes, or any other forms of conduits. However, when such tubes are used to pass oil, this normal frictional phenomena referred to is complicated and aggravated by the variable viscosity condition of the body of the oil particularly when the oil is subjected to colder temperatures. The effect of the lower temperatures on oil being forced through a cold tube or other passage within any type of oil cooler is that the oil next adjacent the internal tube walls or surfaces will become thick and sluggish due to its intimate contact with the cold walls of the tube and will tend to adhere to the surface or walls of the tube and actually function as a retarded insulating layer of oil to impede the flow of heat from the higher temperature oil that is passing through the central or core area of the tube, thereby substantially producing a concentric cellular stratification of the oil within a tube.

In addition to the foregoing problem, a tube of an oil cooler must also be made and constructed so as to be capable of withstanding considerable pressure. The pressure will run far above normal during the warm-up periods when the oil is substantially congealed at lower temperatures and may later be substantially negligible when the oil has become warm and thin after complete and efficient oil flow has been established in such a tube of an oil cooler.

Therefore, one of the main objects of the present invention is to provide a tube of an oil cooler with a suitable internal vane or fin structure to provide a means for inducing turbulence into the oil stream within a tube. This will cause induced intermingling of the various portions of the oil stream flowing through a tube and, consequently, will counteract and break up the cellular stratification hereinbefore referred to, so that a better dissipation of heat will result in said stream of oil. By quickly dissipating the heat of the stream of oil throughout the tubular volume thereof this will obviously reduce the viscosity of the stream of oil adjacent to the tube wall and tend to accelerate the flow of oil relieving internal pressures within the tube and at the same time also distributing heat uniformly to all sections of the tube during the warm-up process of an oil cooler.

Another object of the present invention is also to design the vanes or fin dividers for the purpose of increasing the heat transfer surface within the confines of an oil cooler tube for the purpose of better heat dissipation during the warm-up period of the oil and oil cooler which increased heat transfer surface shall subsequently function to accelerate the excess heat dissipation of the oil when said tube and the core act as a means for cooling the oil.

One of the other objects of the tube of the present construction is the manner in which the internal structure of the tube is arranged and connected therewith so as to form internal supporting structures that will guard against distortion of the tube and which will act in tension and compression to prevent the rupture or collapse of said tube depending upon the pressure differential within and outside of the tube.

All other objects and advantages shall hereinafter appear in the following detailed description having reference to the accompanying drawing.

In the drawing:

Fig. 1 is a side elevational view of a form of tube construction wherein the entire tube including the outer walls thereof and the internal divider is made of one continuous piece of material.

Fig. 2 is a sectional view of the tube of Fig. 1 as taken substantially along the line 2—2 thereof.

Fig. 3 is a side elevational view of a modified form of tube of the one piece construction; and Fig. 4 is a transverse sectional view of the tube in Fig. 3 as taken substantially along the line 4—4 in Fig. 3.

From the several disclosures of the different tubes in the drawing, it is obvious that numerous modified constructions of tubes may be presented for carrying out the objects of the present invention. Any one of the tubes shown may be used in heat transfer cores or more specifically in oil coolers for the purpose hereinbefore pointed out and it should also be noted that these tubes may be used in such a manner as to be surrounded with water or some other liquid of high heat carrying capacity, or the outside of the tubes may be provided with fins or other extended surfaces for dissipating the heat to a stream of air or other gas, or any fluid of low heat carrying capacity. Such structures have not been illustrated and the present explanation shall be confined directly to the tube constructions, per se.

Referring now to Figs. 1 and 2, the present tube is fabricated from a single piece of material wherein one end thereof is provided with a series of convolutions or corrugations 51 terminating in an extended piece approximately at 52 which is curved and indented as at 53 and then substantially wrapped about the corrugations 51 to contact the oppositely disposed apexes of the convolutions. The free end 54 thereof is finally adapted to overlap the end 52 and terminate in a nested position as at 55 within the indentation 53 to produce an externally flush walled tube. All of the adjacently disposed portions of the tube illustrated in Figs. 1 and 2 are brazed and suitably bonded substantially as shown and indicated at 56.

In the tube illustrated in Figs. 3 and 4, the material is also fabricated so as to produce a one piece tube construction. In the latter tube 60, the central portion of an initially flat strip is provided with corrugations or convolutions 61 and the contiguous flat extended ends 62 and 63 of the convolutions 61 are oppositely wrapped for contact with the oppositely disposed apexes of such corrugations or convolutions. In this case, suitable bonding areas are indicated by the number 64 for conveniently sealing the entire tube.

Both of the tubes illustrated in Figs. 2 and 4 and indicated at 50 and 60, respectively, are also shown as having straight sided fins or dividing members for the purpose of strengthening the tube as well as to primarily increase the heat transfer surface within the fluid stream area of said tube.

Inasmuch as there are other numerous possibilities of modifying and rearranging the various structural elements as illustrated in the numerous modifications disclosed herein, the present invention is not to be limited to any particular form, construction, arrangement or combination of parts excepting insofar as shall be governed by the breadth and scope of the appended claims.

What I claim as new and desire to secure by Letters Patent is:

1. A heat transfer tube for heat transfer cores comprising a single piece of material having corrugations at one end thereof and a contiguous portion encircling said corrugations, said contiguous portion being disposed in contact with and rigidly connected to the oppositely related apexes of said corrugations respectively, and said portion having the end thereof overlapped and secured to complete the outer body of said tube, whereby said corrugations prevent distortion of the tube and the latter is interspersed with traversing heat conducting members.

2. A heat transfer tube for a heat transfer core comprising a single piece of material having convolutions intermediate the ends thereof, each of said ends being disposed to overlay the oppositely disposed apexes of said convolutions, said ends each having their edge portions bonded to an apex of a terminal convolution to complete the outer body of said tube, whereby said tube is internally reinforced and additional heat transfer surfaces provided within the confines of said tube.

3. A heat transfer tube for heat transfer cores composed of a single piece of material comprising overlapping parts bonded together and forming the four sides of a flattened tube and a series of corrugated fins extending between and metallically bonded to two opposite sides of the tube.

4. A heat transfer tube for heat transfer cores, comprising a single piece of material having corrugations at one end thereof and a contiguous portion encircling said corrugations, said contiguous portion being disposed in contact with and metallically bonded to the oppositely related apexes of said corrugations respectively, and said portion having the end thereof overlapped and secured to complete the outer body of said tube, whereby said corrugations prevent distortion of the tube and the latter is interspersed with traversing heat conducting members.

ARTHUR B. ARNOLD.